US008631334B2

(12) United States Patent
Betzler et al.

(10) Patent No.: US 8,631,334 B2
(45) Date of Patent: Jan. 14, 2014

(54) VIRTUAL WORLD PRESENTATION COMPOSITION AND MANAGEMENT

(75) Inventors: Boas Betzler, Poughkeepsie, NY (US); Rick A. Hamilton, II, Richmond, VA (US); Neil Katz, Boca Raton, FL (US); Paul B. Moody, Cambridge, MA (US); Brian M. O'Connell, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/651,212

(22) Filed: Dec. 31, 2009

(65) Prior Publication Data

US 2011/0161837 A1 Jun. 30, 2011

(51) Int. Cl.
*G06F 3/048* (2013.01)
*G06F 3/00* (2006.01)
*G06F 17/00* (2006.01)

(52) U.S. Cl.
USPC ........... 715/757; 715/200; 715/706; 715/730; 715/731; 715/732

(58) Field of Classification Search
USPC ......... 715/200, 700, 705, 706, 716, 723–726, 715/730–733, 764
See application file for complete search history.

(56) References Cited

U.S. PATENT DOCUMENTS

| | | | | |
|---|---|---|---|---|
| 5,999,208 A * | 12/1999 | McNerney et al. | ........ | 348/14.08 |
| 6,091,410 A * | 7/2000 | Lection et al. | ................ | 715/706 |
| 7,634,533 B2 * | 12/2009 | Rudolph et al. | .............. | 709/203 |
| 7,921,128 B2 * | 4/2011 | Hamilton et al. | ............. | 707/758 |
| 8,024,370 B2 * | 9/2011 | Slott et al. | ...................... | 707/802 |
| 8,028,021 B2 * | 9/2011 | Reisinger | ...................... | 709/204 |
| 8,095,595 B2 * | 1/2012 | Bobbitt et al. | ................ | 709/204 |
| 2002/0055788 A1 * | 5/2002 | Petrie et al. | ....................... | 700/2 |
| 2003/0067536 A1 * | 4/2003 | Boulanger et al. | ......... | 348/14.08 |
| 2003/0182375 A1 * | 9/2003 | Zhu et al. | ...................... | 709/205 |
| 2004/0128350 A1 * | 7/2004 | Topfl et al. | ..................... | 709/204 |
| 2004/0130566 A1 * | 7/2004 | Banerjee et al. | ............. | 345/716 |
| 2009/0119604 A1 * | 5/2009 | Simard et al. | ................. | 715/757 |
| 2009/0181659 A1 * | 7/2009 | Stalnacke et al. | ............. | 455/416 |
| 2009/0187833 A1 * | 7/2009 | Cheng et al. | .................... | 715/757 |
| 2009/0251457 A1 * | 10/2009 | Walker et al. | ................. | 345/418 |
| 2009/0254842 A1 * | 10/2009 | Leacock et al. | ............... | 715/757 |
| 2009/0254843 A1 * | 10/2009 | Van Wie et al. | ............... | 715/757 |
| 2009/0327899 A1 * | 12/2009 | Bress et al. | ..................... | 715/731 |
| 2010/0070859 A1 * | 3/2010 | Shuster et al. | ................ | 715/706 |
| 2011/0210962 A1 * | 9/2011 | Horan et al. | .................. | 345/419 |

* cited by examiner

*Primary Examiner* — Matt Kim
*Assistant Examiner* — Yongjia Pan
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for composing and managing a presentation in a virtual world. In an embodiment of the invention, a method for composing and managing a presentation in a virtual world can include arranging a set of slides in a presentation, selecting a location in a portion of a virtual world for displaying the slides and also for attendee avatars viewing the slides, composing movements and gestures of a presenter avatar in coordination with a display of slide content of the slides, and presenting the presentation in the location of the virtual world at the location selected for displaying the slides for the attendee avatars placed the selected location for the attendee avatars while applying the composed movements and gestures of the presenter avatar coordinated with a display of slide content of the slides.

9 Claims, 4 Drawing Sheets

VIRTUAL WORLD PRESENTATION COMPOSITION AND MANAGEMENT

BACKGROUND OF THE INVENTION

1. Field of the Invention

The present invention relates to content presentation systems and more particularly to content presentation in a virtual world.

2. Description of the Related Art

As the progenitor to the modern virtual world, the multi-user dungeon provided a revolutionary experience for its first participants more than three decades ago. The multi-user dungeon was and continues to be a multi-player computer game that combines elements of role-playing, first person shooter and social chat. The multi-user dungeon generally executes in a central server configured for simultaneous access by participants over a global computer communications network like the Internet. The multi-user dungeon historically has been text-driven where the immediate environment is presented to participants in text form, and participants engage in actions in the environment through textual directives mimicking the postings of an instant messenger. Non-player characters in the multi-user dungeon can be automated and the actions of the non-player characters can be broadcast to the participants also as textual postings.

Like a multi-user dungeon, virtual reality allows a user to interact with a computer-simulated environment; however in virtual reality, the virtual environment is visual in nature and can be displayed either on a computer screen or through customized or stereoscopic displays. Advanced modes of virtual reality further incorporate other sensory presentation elements, including audio elements and tactile elements. Generally, end-users interact with a virtual reality environment through traditional keyboard and mouse movements, though other input means are provided occasionally including gyroscopic handheld devices and gloves, and joysticks. Consistent throughout all virtual reality experiences, the virtual reality environment reflects the real world environment and has proven invaluable in commercial applications such as flight simulation or combat training.

The virtual world builds upon the multi-user dungeon and virtual reality in order to provide a computer-based simulated environment in which participants interact with one another through three-dimensional visually displayable surrogates referred to as avatars. In this regard, participants "inhabit" the virtual world through their respective avatars. In as much as avatars can freely roam the bounds of the virtual world, virtual worlds expand the boundaries of the multi-user dungeon and permit participants to truly enjoy freedom of motion and exploration within the virtual world. To date, virtual worlds have become such close approximations to reality that the lines of reality have become blurred to the extent that many participants treat ordinary interactions in the virtual world with the same degree of seriousness as those same interactions in the real world.

Virtual worlds provide a new environment in which individuals can collaborate beyond the traditional slide show presentation environment. In fact, the traditional Web conference lacks the interpersonal experience common for the virtual world. Rather, the traditional screen sharing Web conference is nothing more than a glorified slide show composited with some ad hoc communications tools like screen sharing, instant messaging and polling. In the virtual world, however, end users represented by corresponding avatars interact with one another with the intent of closely approximating reality. So much is not possible, however, when managing a presentation and attendees to a presentation must resort to the dull and lifeless two dimensional environment of the Web conference.

BRIEF SUMMARY OF THE INVENTION

Embodiments of the present invention address deficiencies of the art in respect to presentation creation and management and provide a novel and non-obvious method, system and computer program product for composing and managing a presentation in a virtual world. In an embodiment of the invention, a method for composing and managing a presentation in a virtual world can include arranging a set of slides in a presentation, selecting a location in a portion of a virtual world for displaying the slides and also for attendee avatars viewing the slides, composing movements and gestures of a presenter avatar in coordination with a display of slide content of the slides, and presenting the presentation in the location of the virtual world at the location selected for displaying the slides for the attendee avatars placed the selected location for the attendee avatars while applying the composed movements and gestures of the presenter avatar coordinated with a display of slide content of the slides.

In one aspect of the embodiment, the method also can include specifying transitions for slide content in at least one of the slides, and performing the transitions for the slide content when presenting the presentation. In another aspect of the embodiment, the method also can include specifying a configuration of the portion of the virtual world, and applying the configuration to the portion of the virtual world when presenting the presentation. In yet another aspect of the embodiment, the method also can include specifying a location of placement of a podium for the presenter avatar, and placing the podium at the location of placement when presenting the presentation.

In another embodiment of the invention, a virtual world data processing system can be provided. The system can include a host server with processor and memory configured for coupling to client computing devices over a computer communications network. The system further can include a presentation data store coupled to the host server, a virtual world server executing in the memory by the processor and managing a virtual world accessible by end users through virtual world clients executing in respective ones of the client computing devices, and a presentation creation tool coupled to the presentation data store.

The tool can include program code enabled to arrange a set of slides in a presentation, select a location in a portion of the virtual world for displaying the slides and also for attendee avatars viewing the slides, and to compose movements and gestures of a presenter avatar in coordination with a display of slide content of the slides. Finally, the system can include a presentation controller coupled to the virtual world server and the presentation data store. The controller can include program code enabled to present the presentation in the location of the virtual world at the location selected for displaying the slides for the attendee avatars placed the selected location for the attendee avatars while applying the composed movements and gestures of the presenter avatar coordinated with a display of slide content of the slides.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for composing and managing a presentation in a virtual world. In accordance with an embodiment of the invention, presentation elements of a presentation can be composed and ordered for presentation in a virtual world. Placement of the presentation elements within the virtual world can be specified. Further, an appearance and movements of an avatar representative of a presenter can be specified in conjunction with the order and placement of the presentation elements in the virtual world. Finally, both the avatar and the presentation elements of the presentation can be presented in the virtual world according to the specified order and placement of the presentation elements and the specified appearance and movements of the avatar.

Figure 1:
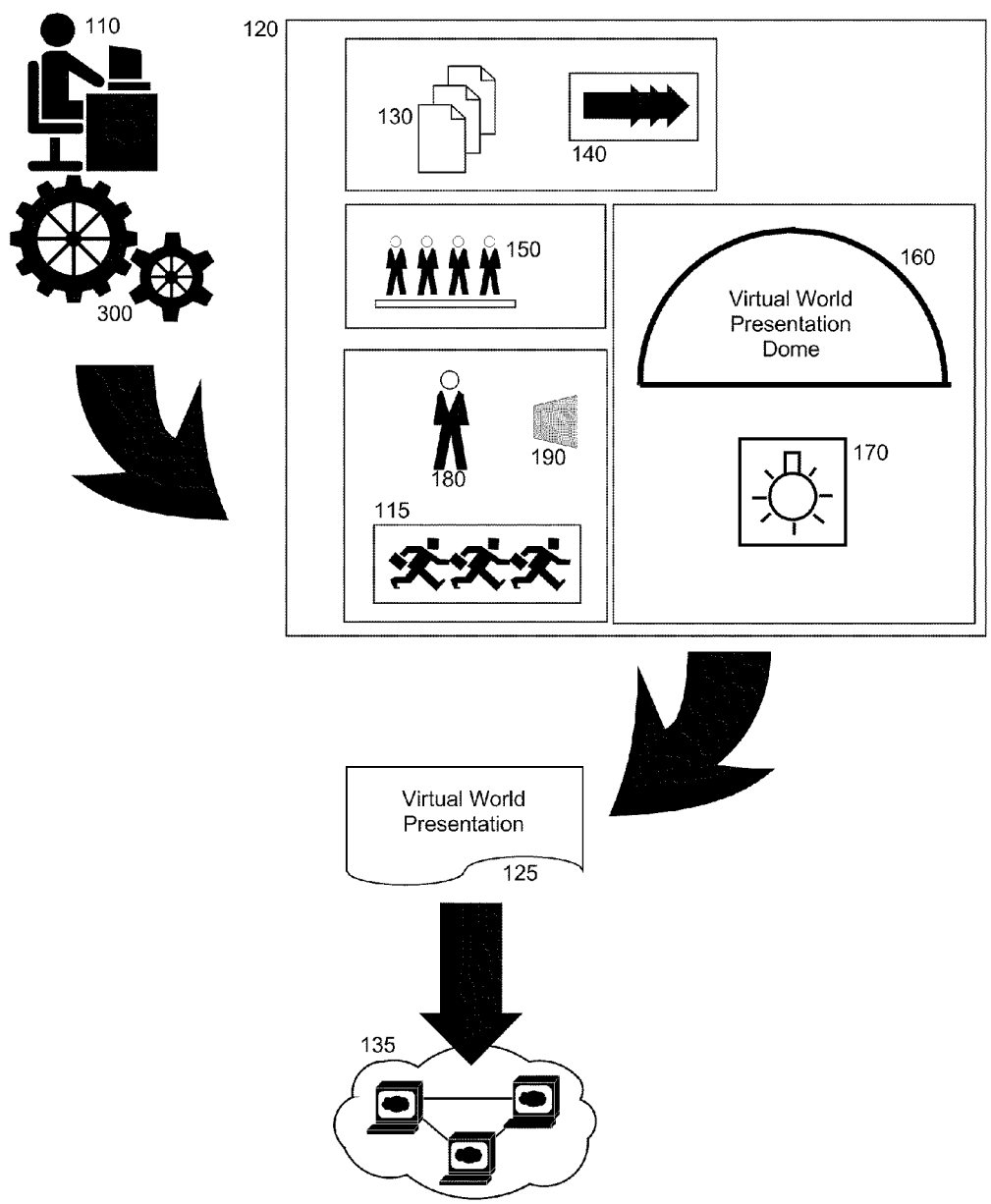
FIG. 1 is pictorial illustration of process for composing and managing a presentation in a virtual world.

In further illustration, FIG. 1 is pictorial illustration of a process for composing and managing a presentation in a virtual world. As shown in FIG. 1, an end user 110 can access a presentation composition and management data processing system 300 to generate a virtual world presentation 125 with an aggregation of presentation elements 120 for rendering and processing in a virtual world 135. The presentation elements 120 can include a selection of slides 130 and corresponding transitions 140 indicating an order, timing and nature of transition from slide portion to slide portion of the slides 130 and from slide 130 to slide 130. The presentation elements 120 also can include a specification of a virtual world presentation dome 160 in the virtual world 135—namely the location and space in the virtual world 135 in which the presentation 125 is to be presented by a presenting avatar 180 and viewed by one or more attendee avatars 150.

Both a placement of a podium 190 for the presenting avatar 180 and also a placement of the attendee avatars 150 can be specified within the virtual world presentation dome 160 and the environment 170 of the virtual world presentation dome 160 further can be specified, such as lighting. Yet further, an appearance of the presenting avatar 180 can be specified along with one or more gestures and movements 115 of the avatar in association with each of the slides 130, and at even a more granular level with respect to different slide portions of the slides 130. Once the presentation elements 120 have been specified, the presentation elements 120 can be compiled into a virtual world presentation 125 and loaded for presentation in the virtual world 135.

Figure 2A:
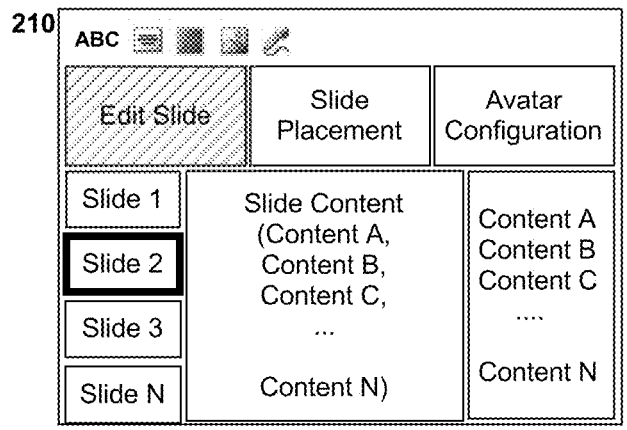
FIGS. 2A through 2C, taken together, are a screen shot of a user interface to a virtual world presentation composition tool.
Figure 2B:
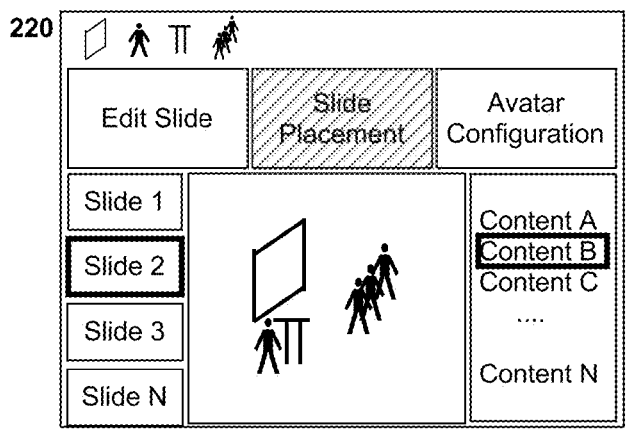
Figure 2C:
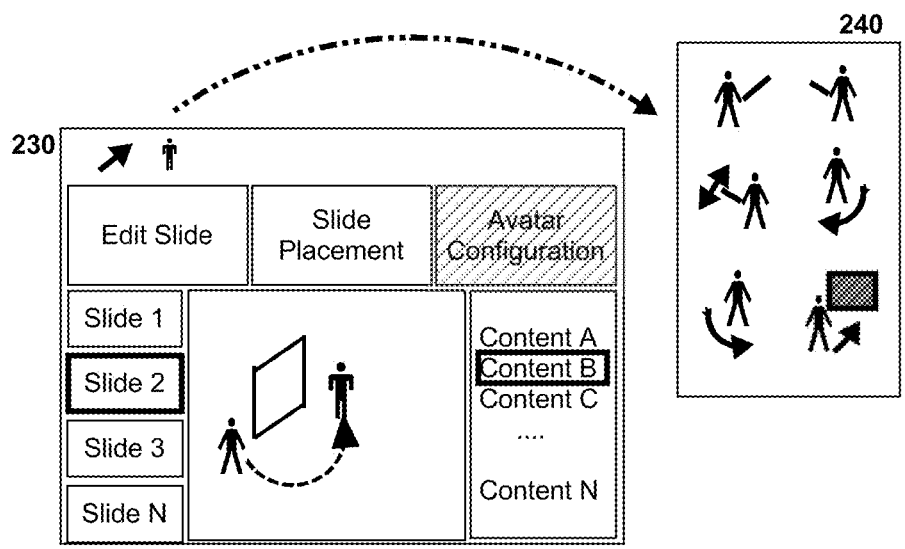

In further illustration of the process of creating the virtual world presentation 125 for deployment in the virtual world 135, FIGS. 2A through 2C, taken together, are a screen shot of a user interface to a virtual world presentation composition tool. With respect to FIG. 2A, the composition tool can include a slide editor 210. The slide editor 210 can include a listing of slides in a slide navigator, a central display of slide content for a selected slide in the navigator and an adjacent transition listing for the slide content. A tool bar also can be provided to permit the execution of slide editing operations such as text editing, text formatting, color and background editing, image insertion and audio insertion, to name only a few examples.

FIG. 2B demonstrates the activation of the slide placement editor 220 in the composition tool. The slide placement editor 220 can include a listing of slides in a slide navigator and a central presentation dome canvas in which different presentation elements can be placed, such as a presenting avatar, a podium for the presenting avatar, a presentation screen for the slides and the attendee avatars. The placement can vary according to slide content in a slide. As such, an animation listing for the slide content can be displayed adjacent to the canvas so that the placement of the presenting avatar, the podium for the presenting avatar, the presentation screen for the slides and the attendee avatars can vary even within a single slide as transitions execute for slide content.

Finally, FIG. 2C illustrates the activation of the avatar configuration editor 230. The avatar configuration editor 230 can include a listing of slides in a slide navigator and a central presentation dome canvas in which movements of the presenting avatar can be defined for specific portions of a selected slide during transitions from slide portion to slide portion or even slide to slide. Additionally, gestures for the presenting avatar can be selected from gesture tool bar 240 according to specific portions of a selected slide during transitions from slide portion to slide portion. The gestures can include the rotation of the presenting avatar, the movement of a hand to point to a specific portion of a selected slide, or the movement of the presenting avatar towards or away from a selected slide, to name only a few possible gestures.

Optionally, though not illustrated, the composition tool can include a heads up display (HUD) editor. The HUD editor can include a palette of permitted actions by each of the attendee avatars on a slide by slide basis, slide content by slide content basis for each slide. In this regard, a particular slide can be selected and different actions can be dragged and dropped from the palette onto a HUD canvas. Exemplary actions include "raise hand", "vote" and "submit content" to name only a few actions. In this way, the permissible interactions by attendee avatars can be combined into a single HUD viewed by each of the attendee avatars and the permissible interactions can vary from slide to slide in the presentation.

Figure 3:
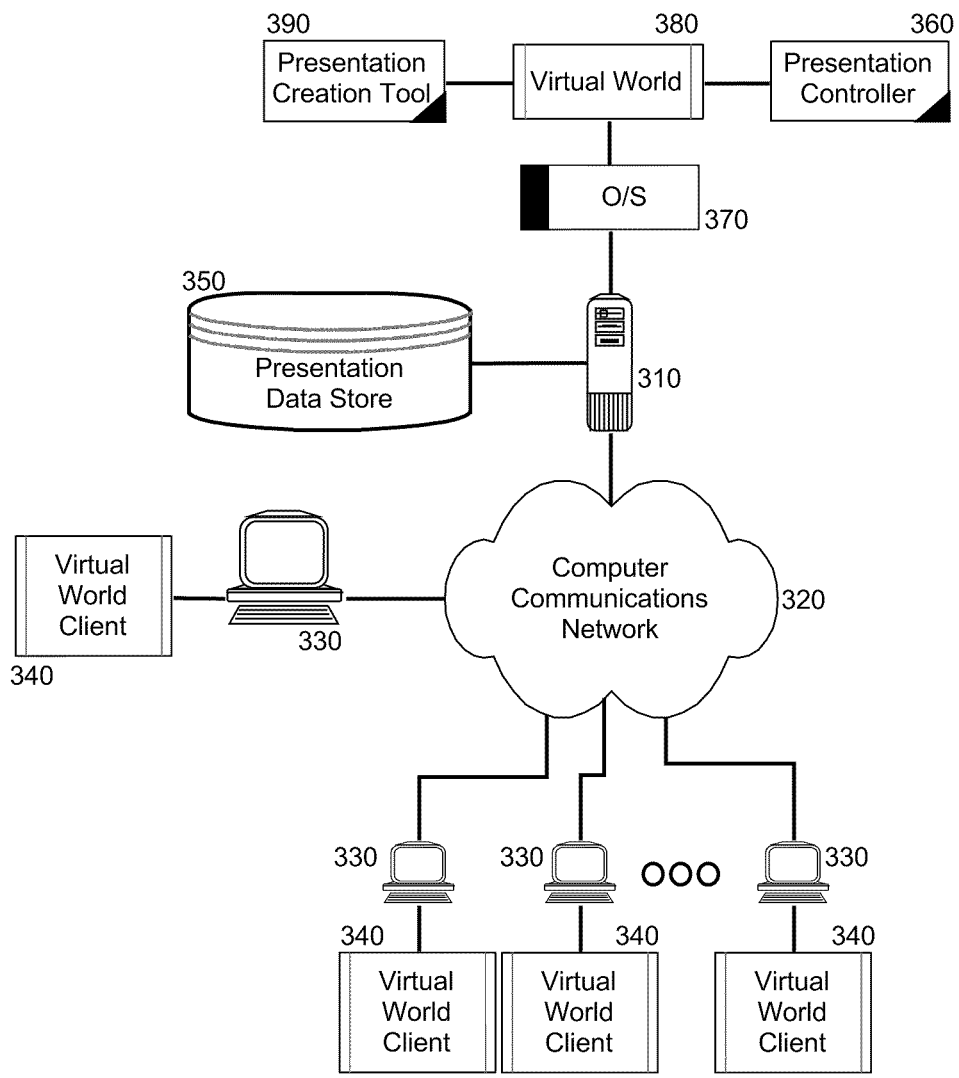
FIG. 3 is a schematic illustration of a virtual world presentation composition and management data processing system; and, FIG. 4 is a flow chart illustrating a process for composing and deploying a virtual world presentation in a virtual world.

The composition tool of FIGS. 2A through 2C can be implemented in a virtual world presentation composition and management data processing system. In even yet further illustration, FIG. 3 is a schematic illustration of a virtual world presentation composition and management data processing system. The system can include a host server 310 configured for coupling to multiple different client computing devices 330 over computer communications network 320. The host server 310 can include an operating system 370 executing in the memory of the host server 310 by the processor of the host server 310. The operating system 370 in turn can support the operation of a virtual world server 380 generating and managing a virtual world accessible by end users by way of virtual world clients 340 in respective ones of the client computing devices 330. In this regard, the virtual world generated and managed by the virtual world server 380 can provide for multiple different locations in which avatars controlled by the different end users can interact in a three-dimensional virtual reality environment.

Of note, both a presentation creation tool 390 and a presentation controller 360 can be coupled to the virtual world server 360. The presentation creation tool 390 can include program code that when executed by the processor of the host server 310 can generate a user interface through which an end user can compose a virtual world presentation. The virtual world presentation can include a set of slides in a specified order, each slide including content and a specified set of transitions for the content of each slide. The virtual world presentation further can include a specified configuration for a virtual world presentation dome, a specified placement of a presenting avatar and attendee avatars, a placement in the dome for presentation of the slides, and a podium from which the presenting avatar presents the slides. Finally, the virtual world presentation includes specified avatar movements and gestures coordinated with the presentation of the content of the slides and the presentation of the slides.

The virtual world presentation can be stored in the presentation data store 350 and retrieved for presentation in a virtual world managed by the virtual world server 380 by way of presentation controller 360. In this regard, the presentation controller 360 can include program code that when executed by the processor of the host server 310 can display slides in the virtual world presentation in an order specified by the virtual world presentation in a location in a virtual reality presentation dome specified by the virtual world presentation. The program code of the presentation controller 360 further can include program code that when executed by the processor of the host server 310 can display a presenting avatar and attendee avatars in a location in the dome specified by the virtual world presentation for each slide of the presentation. Finally, the program code of the presentation controller when executed by the processor of the host server 310 can animate the presenting avatar with gestures and movements specified by the virtual world presentation for each slide of the presentation, and optionally for different content in different ones of the slides of the presentation.

Figure 4:
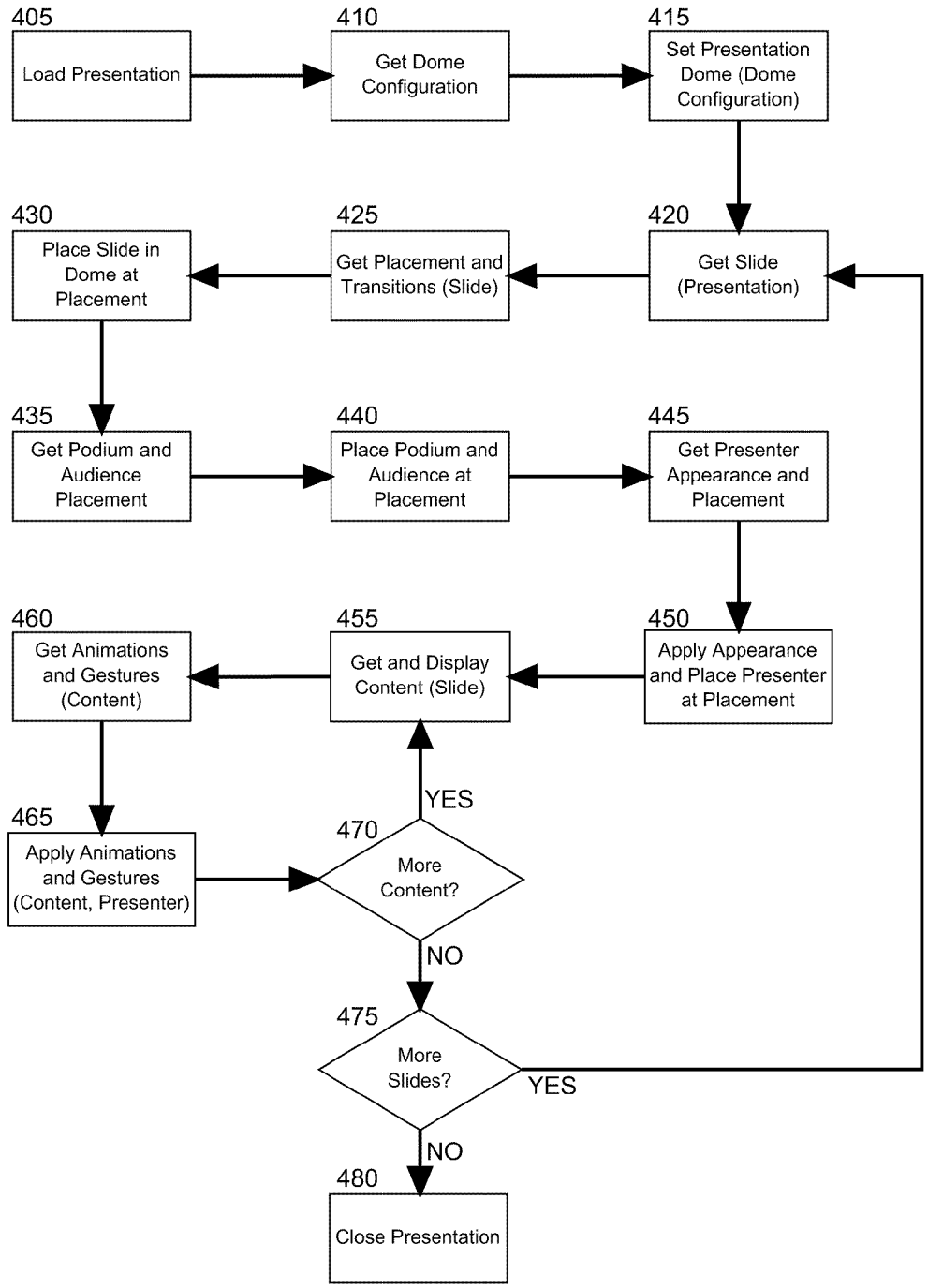

In more particular illustration of the operation of the presentation controller 360, FIG. 4 is a flow chart illustrating a process for composing and deploying a virtual world presentation in a virtual world. Beginning in block 405, a virtual world presentation can be loaded for display and management in a location of a virtual world. In block 410, a configuration for a virtual world presentation dome can be retrieved, including lighting, dimensions and size. In block 415, a virtual world presentation dome can be generated in a location in the virtual world according to the retrieved configuration. Thereafter, the process can continue in block 420.

In block 420, a first slide in the presentation can be retrieved for display in the dome. In block 425, a location of placement for the slide can be determined as well as transitions between slide content in the retrieved slide. In block 430, the retrieved slide can be placed at the location of placement in the dome. In block 435, a location of placement for a podium and the attendee avatars for the presentation can be retrieved and in block 440 the podium and attendee avatars can be placed at the location in the presentation dome. Likewise, in block 445 an avatar appearance and location of placement in the dome can be retrieved and in block 450, the presenter avatar can be given the appearance and placed within the dome at the retrieved location.

In block 455, the first content of the slide can be displayed in the dome and in block 460 animated as specified by the presentation. In block 465, animations and gestures specified for the presenter avatar can be applied according to slide content of the slide. In decision block 470, if additional content remain to be processed in the slide, in block 455 the next content of the slide can be retrieved and displayed. In decision block 470, when no more content remains to be processed for the slide, in decision block 475 it can be determined if additional slides remain to be displayed for the presentation. If so, in block 420 a next slide can be retrieved for the presentation and the process can repeat through block 425. Otherwise, the presentation can close in block 480.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for composing and managing a presentation in a virtual world, the method comprising:
   arranging a set of slides in a presentation;
   selecting a location in a portion of a virtual world for displaying the slides and also for attendee avatars viewing the slides;
   composing movements and gestures of a presenter avatar in coordination with a display of slide content of the slides;
   presenting the presentation in the location of the virtual world at the location selected for displaying the slides for the attendee avatars placed at the selected location for the attendee avatars while applying the composed movements and gestures of the presenter avatar coordinated with a display of slide content of the slides;
   specifying different permissible sets of attendee avatar actions for different ones of the slides, so that the permissible sets of attendee avatar actions can vary from slide to slide; and,
   during presentation of each of the slides, rendering a heads up display (HUD) for each of the attendee avatars including only a specified permissible set of attendee avatar actions for a presented one of the slides.

2. The method of claim 1, further comprising:
   specifying transitions for slide content in at least one of the slides; and,
   performing the transitions for the slide content when presenting the presentation.

3. The method of claim 1, further comprising:
   specifying a configuration of the portion of the virtual world; and,
   applying the configuration to the portion of the virtual world when presenting the presentation.

4. The method of claim 1, further comprising:
   specifying a location of placement of a podium for the presenter avatar; and,
   placing the podium at the location of placement when presenting the presentation.

5. A virtual world data processing system comprising:
   a host server with processor and memory configured for coupling to a plurality of client computing devices over a computer communications network;

a presentation data store coupled to the host server;

a virtual world server executing in the memory by the processor and managing a virtual world accessible by end users through virtual world clients executing in respective ones of the client computing devices;

a presentation creation tool coupled to the presentation data store, the presentation creation tool comprising program code enabled to arrange a set of slides in a presentation, select a location in a portion of the virtual world for displaying the slides and also for attendee avatars viewing the slides, to compose movements and gestures of a presenter avatar in coordination with a display of slide content of the slides, and to specify different permissible sets of attendee avatar actions for different ones of the slides, so that the permissible sets of attendee avatar actions can vary from slide to slide; and, a presentation controller coupled to the virtual world server and the presentation data store, the presentation controller comprising program code enabled to present the presentation in the location of the virtual world at the location selected for displaying the slides for the attendee avatars placed at the selected location for the attendee avatars while applying the composed movements and gestures of the presenter avatar coordinated with a display of slide content of the slides and to render a heads up display (HUD) for each of the attendee avatars including only a specified permissible set of attendee avatar actions for a presented one of the slides.

6. A computer program product comprising a computer usable storage medium storing computer usable program code for composing and managing a presentation in a virtual world, the computer program product comprising:

computer usable program code for arranging a set of slides in a presentation;

computer usable program code for selecting a location in a portion of a virtual world for displaying the slides and also for attendee avatars viewing the slides;

computer usable program code for composing movements and gestures of a presenter avatar in coordination with a display of slide content of the slides;

computer usable program code for presenting the presentation in the location of the virtual world at the location selected for displaying the slides for the attendee avatars placed at the selected location for the attendee avatars while applying the composed movements and gestures of the presenter avatar coordinated with a display of slide content of the slides;

computer usable program code for specifying different permissible sets of attendee avatar actions for different ones of the slides, so that the permissible sets of attendee avatar actions can vary from slide to slide; and, computer usable program code for during presentation of each of the slides, rendering a heads up display (HUD) for each of the attendee avatars including only a specified permissible set of attendee avatar actions for a presented one of the slides.

7. The computer program product of claim 6, further comprising:

computer usable program code for specifying transitions for slide content in at least one of the slides; and, computer usable program code for performing the transitions for the slide content when presenting the presentation.

8. The computer program product of claim 6, further comprising:

computer usable program code for specifying a configuration of the portion of the virtual world; and, computer usable program code for applying the configuration to the portion of the virtual world when presenting the presentation.

9. The computer program product of claim 8, further comprising:

computer usable program code for specifying a location of placement of a podium for the presenter avatar; and, computer usable program code for placing the podium at the location of placement when presenting the presentation.

\* \* \* \* \*